(12) United States Patent
Al Sulatieen

(10) Patent No.: US 9,922,573 B1
(45) Date of Patent: Mar. 20, 2018

(54) MULTI-COMPARTMENT BAG FOR TEACHING ART

(71) Applicant: Hessah Saud Al Sulatieen, Safat (KW)

(72) Inventor: Hessah Saud Al Sulatieen, Safat (KW)

( * ) Notice: Subject to any disclaimer, the term of this patent is extended or adjusted under 35 U.S.C. 154(b) by 0 days.

(21) Appl. No.: 15/420,071

(22) Filed: Jan. 30, 2017

(51) Int. Cl.
*G09B 1/04* (2006.01)
*G09B 19/00* (2006.01)
*G09B 11/00* (2006.01)
*A45C 11/36* (2006.01)
*A45C 11/34* (2006.01)
*A45F 3/02* (2006.01)
*B44D 3/00* (2006.01)
*A45F 3/00* (2006.01)

(52) U.S. Cl.
CPC ............... *G09B 1/04* (2013.01); *A45C 11/34* (2013.01); *A45C 11/36* (2013.01); *A45F 3/02* (2013.01); *B44D 3/003* (2013.01); *G09B 11/00* (2013.01); *G09B 19/00* (2013.01); *G09B 19/0023* (2013.01); *A45F 2003/003* (2013.01)

(58) Field of Classification Search
USPC .......................................................... 434/81
See application file for complete search history.

(56) References Cited

U.S. PATENT DOCUMENTS

| 213,166 | A | 3/1879 | Brownell |
| 1,901,861 | A | 3/1933 | Baker |
| 3,132,439 | A | 5/1964 | McGill |
| 4,061,224 | A | 12/1977 | Fuhri |
| 4,294,348 | A | 10/1981 | Hastings |
| 4,852,725 | A | 8/1989 | Folsom |
| 5,024,536 | A | 6/1991 | Hill |
| 5,954,193 | A | 9/1999 | Bartee |
| 8,167,131 | B1 | 5/2012 | Anderson |
| 2001/0047951 | A1* | 12/2001 | O'Connor ............... A45D 34/04 206/575 |
| 2005/0003331 | A1* | 1/2005 | Menzies ................... G09B 5/00 434/81 |
| 2005/0274631 | A1 | 12/2005 | Martin |
| 2006/0065569 | A1* | 3/2006 | Jiang-Stein ............ G09B 19/00 206/579 |
| 2016/0286915 | A1* | 10/2016 | Munoz ................... A45C 7/009 |

FOREIGN PATENT DOCUMENTS

FR 2653312 4/1991

* cited by examiner

*Primary Examiner* — James Hull
(74) *Attorney, Agent, or Firm* — Richard C. Litman

(57) ABSTRACT

The multi-compartment bag for teaching art includes a first section and a second section selectively coupled to the first section. A plurality of elongate holders attached in a compact circular pattern to form the first section. The second section includes a plurality of caps arranged in a circular pattern to cap the first section. The holders store various art supplies. The caps each have a first subsection and a second subsection divided by an inner wall. The first subsection covers the corresponding holders, and the second subsection stores a deck of educational cards. An endcap covers the second subsection to close and retain the cards. The cards serve as a visual aid relating to the subject matter being taught by a user. A handle on the first section enables portability.

7 Claims, 4 Drawing Sheets

MULTI-COMPARTMENT BAG FOR TEACHING ART

BACKGROUND OF THE INVENTION

1. Field of the Invention

The present invention relates to teaching aids, and particularly to a multi-compartment bag for teaching art and enabling easy transport of art materials and art-related teaching cards.

2. Description of the Related Art

Art teachers typically require visual teaching aids to effectively teach concepts relating to, e.g., color palette, line variations, paints, inks, brush strokes, techniques, and other fundamentals. A teacher may already have the necessary tools and supplies in a typical classroom or studio, yet there may be circumstances in which the teacher's duties require travel to several different locales, or the classroom serves as a multi-purpose room without sufficient storage for these items. In these instances, the teacher must transport those same tools and supplies, even on a daily basis.

Transport of such items may be accomplished with a variety of small storage boxes and small bags stuffed into one or more larger ones. While suitable for subsequent travel, this type of solution may potentially create a chaotic jumble of materials that must be sorted prior to or during a teaching session, which consumes valuable time for the students as well as the teacher. Moreover, the larger bags may be difficult to carry, especially daily.

In light of the above, it would be a benefit in the art of teaching to provide some means of toting art supplies and teaching aids in an organized manner. Thus, a multi-compartment bag for teaching art solving the aforementioned problems is desired.

SUMMARY OF THE INVENTION

The multi-compartment bag for teaching art includes a first section and a second section selectively coupled to the first section. A plurality of elongate holders attached in a compact circular pattern form the first section. The second section includes a plurality of caps arranged in the same pattern to cap the first section. The holders store various art supplies. The caps each have a first subsection and a second subsection divided by an inner wall. The first subsection covers the corresponding holder, and the second subsection stores a deck of educational cards. An endcap covers the second subsection to close and retain the cards. The cards serve as a visual aid relating to the subject matter being taught by a user. A handle on the first section enables portability.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The multi-compartment bag for teaching art, generally referred to by the reference number 10 in the Figures, provides an organized means of storing various art supplies and a teaching tool combined into a single bag to facilitate portability. The multi-compartment bag 10 includes a first section 20 and a second section 30 covering the first section.

Figure 1:
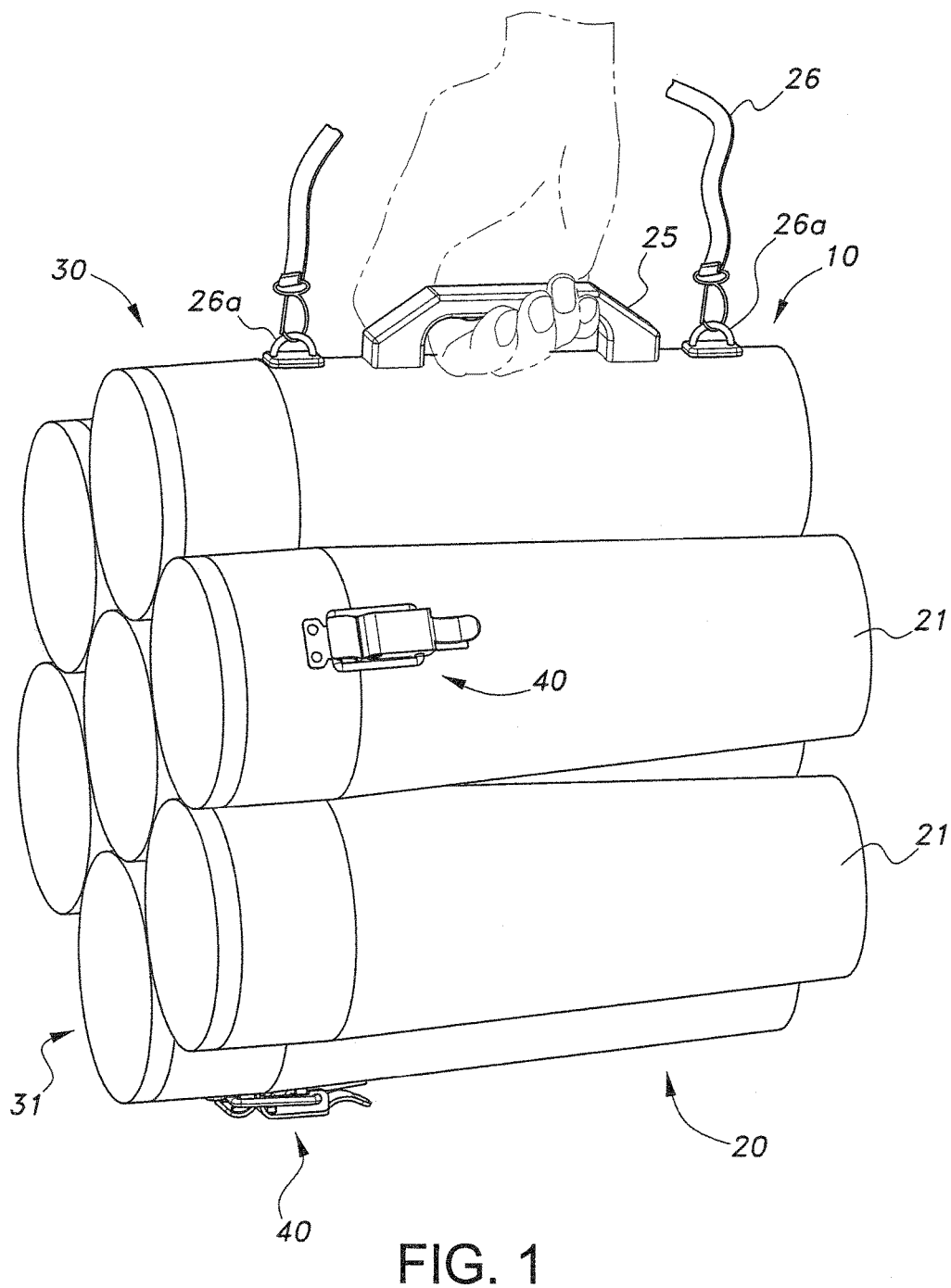
FIG. 1 is an environmental, perspective view of a multi-compartment bag for teaching art according to the present invention.
Figure 2:
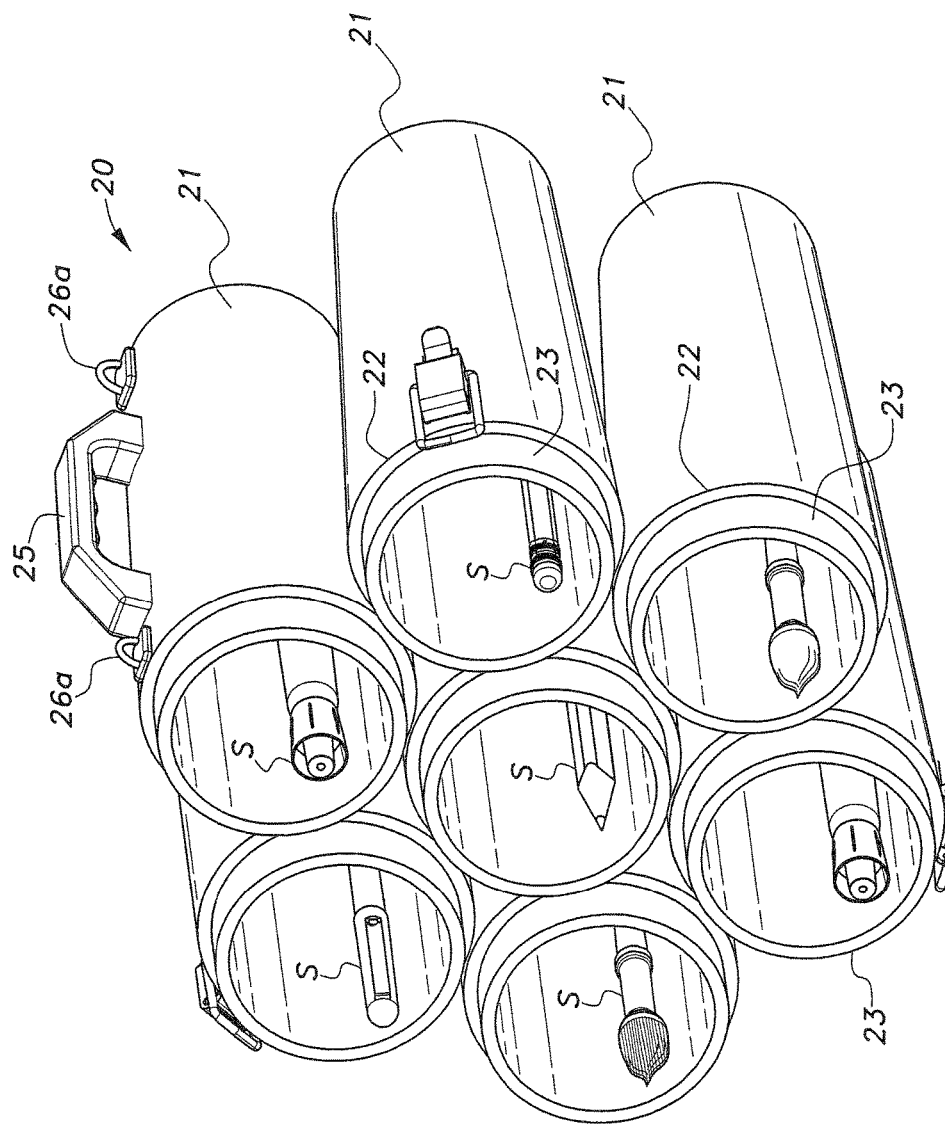
FIG. 2 is a first section of the multi-compartment bag for teaching art shown in FIG. 1.

As best seen in FIGS. 1 and 2, the first section 20 includes a plurality of holders 21 forming compartments for storing art supplies S, such as pencils, pens, chalk, brushes, markers, and the like. Each holder 21 is preferably an elongate frustoconical cup with an opening that enables storage of various objects therein. It is also contemplated that the holders 21 may be provided in other shapes such as straight cylinders, square tubes, and the like as long as the shape allows for storage of the desired objects. The length of each holder 21 is at least suitably long to hold most standard lengths of writing, drawing, and painting instruments. The holders 21 are preferably connected together in a circular pattern to foini a compact, unitary first section 20. As shown, there are seven holders 21 arranged in the circular pattern. The number of holders 21 may be varied, but the circular pattern is preferred due to the compact nature of a circle. Alternatively, each holder 21 may be separable or removable but held together vis-à-vis a holder webbing similar to a soft drink pack holder but sturdier in construction.

The second section 30 can be removable from the first section 20. Each holder 21 may include a projecting neck portion 23 extending past a top ledge or lip 22 of the opening in the corresponding holder 21 to a predetermined length. The neck portion 23 enables detachable connection of the second section 30 thereon as will be explained further hereinbelow. The outer diameter of the neck portion 23 is preferably smaller in diameter compared to the outer diameter of the lip 22.

To increase portability, the first section 20 includes a handle 25 attached to one of the holders 21 so as to enable easy carry of the multi-compartment bag 10. Alternatively, one of the holders 21 may be provided with spaced connector hoops 26a and a shoulder strap 26 for selective attachment thereto. Users may find shoulder-carry more comfortable, and the shoulder strap 26 enables this form of portability. The shoulder strap 26 may also be adjustable to accommodate the dimensions and comfort of the user's body.

Figure 3:
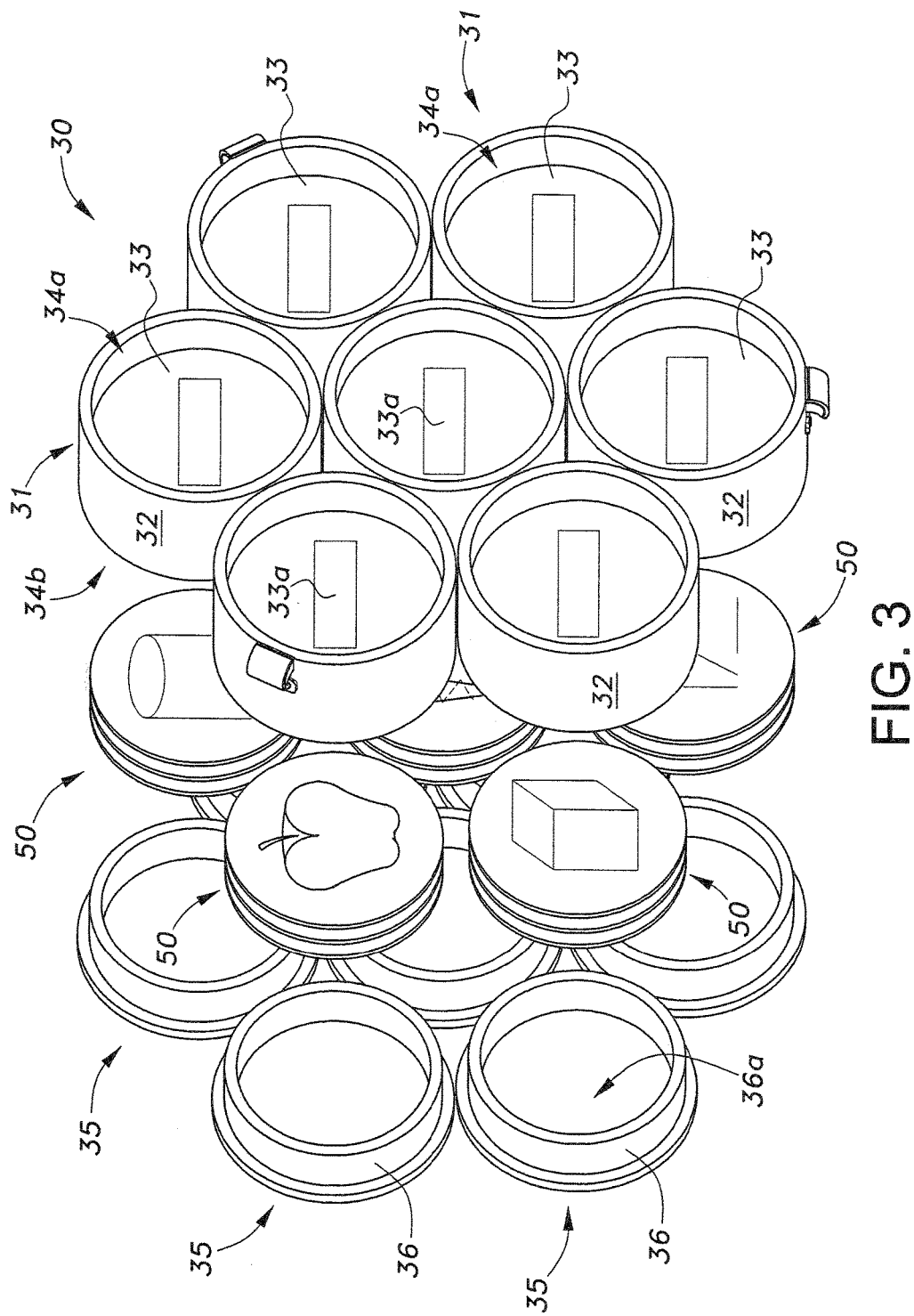
FIG. 3 is an exploded view of a second section of the multi-compartment bag for teaching art shown in FIG. 1.

As best seen in FIGS. 1 and 3, the second section 30 serves as a cover or cap for the first section 20 and also includes compartments therein for storing educational materials in the form of cards. The second section 30 includes a plurality of caps 31 with each covering one of the holders 21 when assembled. The second section 30 functions as a unit for the user to selectively uncover or cover the openings of the holders 21. As such, the caps 31 are connected to each other in the same manner as the holders 21 and arranged in the same circular pattern as the holders 21 so as to enable easy mating between the two sections. Thus, the number of caps 31 is seven to match the number of holders 21.

Each cap 31 is preferably an elongate cylinder having an outer wall 32. An inner wall 33 divides the cap 31 into two or first and second subsections 34a, 34b, each subsection 34a, 34b being defined by a respective inner recess inside the cap 31 on opposite sides of the inner wall 33. The first subsection 34a serves as the main capping portion of the cap 31. As such, a portion of the outer wall 32 defining the first subsection 34a has a length or height and an inner diameter that fits over and around the neck portion 23 of the corresponding holder 21. The tolerance between the neck portion 23 and the portion of the outer wall 32 is preferably tight for a secure, press-fit engagement between these parts when assembled. This tolerance may become loose over time through repeated use. However, the multi-compartment bag 10 may be provided with a latch mechanism 40 to secure the connection between the first section 20 and the second section 30. This latch mechanism 40 insures that the second section 30 remains capped and secured to the first section 20 even if the user and/or the multi-compartment bag 10 experience jostling or impacts during transport and use. This also assists in preventing inadvertent spills of the contents therein.

The second subsection 34b stores a variety of educational teaching cards 50. Each set or deck of cards 50 preferably relate to a specific topic such as color palette, line variations, physical forms, drawing subjects, and the like. To insure the cards 50 remain inside the second subsection 34b, the second section 30 includes a plurality of endcaps 35 each configured to cover an opening at the second subsection 34b on the corresponding cap 31. An annular wall 36 extends axially from one side of each endcap 35 defining a recess 36a. Similar to the neck portion 23, the outer diameter of the annular wall 36 is about the same as the inner diameter of the second subsection 34b so as to provide relatively close tolerance between these parts. This enables a relatively secure press-fit engagement between the endcap 35 and the second subsection 34b when assembled.

In use, a deck of cards 50 is placed inside the recess 36a prior to inserting the endcap 35 into the second subsection 34b. The cards 50 are preferably constructed with similar dimensions as the recess 36a so that they may be securely stored therein. When the user requires the use of one of the decks of cards 50, the user removes the desired endcap 35 and retrieves the desired deck of cards 50 from the recess 36a.

Alternative construction of the endcap 35 is also contemplated. Though the endcap 35 has been described as a press-fit insertable component, the endcap 35 and the corresponding second subsection 34b may be provided with mating threads for a threaded connection. The endcap 35 may also be constructed to fit around the opening of the second subsection 34b in much the same manner as a lens cap for cameras. Moreover, the cards 50 may simply be stored inside second subsection 34b without resorting to using the recess 36a in the endcap 35.

While the multi-compartment bag 10 serves as a means of storing and carrying art-related implements, the multi-compartment bag 10 also serves as a teaching aid through the use of the cards 50 mentioned above. Each deck of cards 50 represents a specific topic for teaching. To assist in organizing the various decks of cards 50, the inner wall 33 on the side of the first subsection 34a includes indicia or label 33a representing or describing the deck of cards 50 stored in the second subsection 34b on the opposite side of the inner wall 33.

Figure 4:
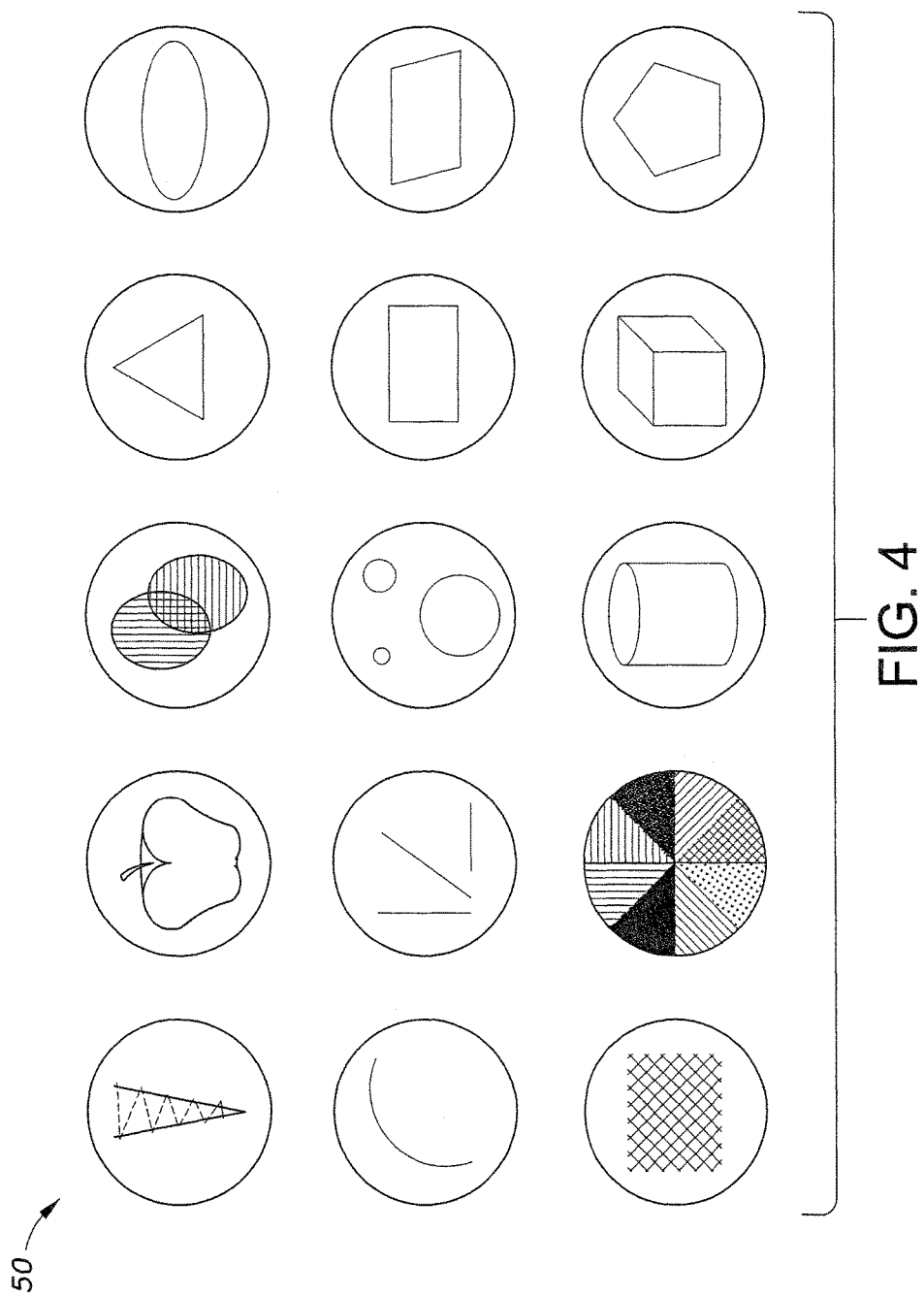
FIG. 4 is a plan view of teaching cards with exemplary indicia for storage in the second section of the multi-compartment bag for teaching art shown in FIG. 1.

Some examples of the topics covered by the various cards 50 are shown in FIG. 4. It is noted that each representative card in FIG. 4 is an example of one or more cards in a deck, and the deck relates to the specific topic or theme. For example, the second card in the third row may be a color wheel showing the various relationships between the primary colors and the effects of mixing the primary colors in different ratios to obtain other colors. Each card in the color wheel deck may cover a certain gamut of colors and the typical contrasting colors that complement each other when used in a medium of choice. These include basic colors, minor colors, hot colors, cold colors, color degradation, and color completion. The third card from the first row may represent the effects of shading and the techniques thereof in the form of lines, hatches, and the like. The second card in the first row may be a subject of study, such as an apple or a range of fruits, for students to draw, paint, or build in their medium of choice or as directed by the teacher or user. The cards shown in the last three columns starting with the plurality of circles may be representative of various shapes for study by the students, with each subsequent card in the deck being a variation on the same theme. The first two cards in the second row may be a study in lines, one covering curved lines and the other covering straight lines.

It is noted that the cards 50 may include subject matter other than what is shown in FIG. 4. For example, a deck of cards may include a step-by-step process of drawing a particular subject, such as faces and the like, ranging from simplistic models to more complex. Students can easily implement the lessons learned from the study of lines and shapes into recreating the subject shown on the cards. Other themes that may be represented by the cards 50 include, but are not limited to, themes for generating ideas on potential art projects; themes relating to the physical senses, such as touch, smell, taste, hearing, etc.; and games. Thus, the cards 50 serve as an educational visual aid to convey the desired subject matter and assist students in absorbing the material.

Though the cards 50 have been described as being arranged by theme in a deck inside each second subsection 34b, the thematic arrangement may also be varied. For example, when the endcaps 35 are removed from the second subsection 34b, the cards 50 become exposed to view. Utilizing this feature and the circular arrangement of the caps 31, the cards 50 may be arranged, by theme, in a circular pattern so that all the cards relating to the topic of interest is exposed all at once when the endcaps 35 are removed. Each subsequent card 50 in the respective second subsection 34b may be a continuation of the same theme or another topic. The frustoconical shape of the holders 21 enable the multi-compartment bag 10 to rest on a surface at an angle, which also assists in retaining the cards 50 inside the second subsections 34b while being used in the manner described above.

It is noted that the multi-compartment bag 10 encompasses a variety of alternatives. For example, the plurality of holders 21 may be non-uniform in dimensions though they have been shown as uniform. In other words, one or more of the holders 21 may have different lengths and/or different cross sectional shapes. The corresponding caps 31 would also have matching cross-sectional shapes to enable capping between the first section 20 and the second section 30, at least with the portion of the caps 31 mating with the holders 21. The cards 50 may also be constructed with matching shapes.

It is to be understood that the present invention is not limited to the embodiments described above, but encompasses any and all embodiments within the scope of the following claims.

I claim:

1. A multi-compartment bag for teaching art, comprising:
a first section having seven holders connected together about each of their outer peripheries and arranged in a circular pattern to form a unitary first section, each holder having a housing adapted to store one or more art-related instruments therein;
a second section selectively coupled to the first section, the second section having seven elongate caps connected together to seal a respective holder housing, each elongate cap including:
a first subsection, the first subsection having dimensions mating with the opening of a corresponding holder;
a second subsection coaxial with the first subsection;
an inner wall dividing the cap into two coaxial and opposite facing recesses, the recesses defining the first subsection and the second subsection, respectively;
at least one educational card stored inside the second subsection, wherein the at least one card comprises distinct indicia having visual representation of a topic of study;
wherein the inner wall comprises indicia on a side of the inner wall facing the first subsection, the indicia distinctly detailing the topic of study covered by the at least one card stored in the second subsection and corresponding to its respective distinct indicia;
an endcap selectively covering the second subsection and securing the at least one card therein;
a handle disposed on one of the holders so as to enable easy carry of the multi-compartment bag; and
a latch mechanism disposed on the first section and the second section, the latch mechanism selectively securing the second section to the first section when the second section caps the first section.

2. The multi-compartment bag for teaching art according to claim 1, wherein each holder comprises an elongate frustoconical cup to hold said art-related instruments.

3. The multi-compartment bag for teaching art according to claim 1, wherein each holder further comprises an elongate, annular neck portion projecting axially from said opening.

4. The multi-compartment bag for teaching art according to claim 3, wherein each said cap comprises an elongate cylinder having an outer wall, a portion of said outer wall forming said first subsection having a shape mating with said neck portion of a corresponding holder.

5. The multi-compartment bag for teaching art according to claim 1, wherein each endcap comprises an annular wall extending axially from one side of said endcap, said annular wall having a diameter to fit inside said second subsection and a recess, said recess adapted to selectively hold said at least one card.

6. The multi-compartment bag for teaching art according to claim 1, further comprising a pair of spaced connector hoops on one of said plurality of holders and a shoulder strap selectively coupled to said connector hoops, said shoulder strap facilitating shoulder-carry of said multi-compartment bag.

7. A method of teaching art comprising the steps of:
providing a multi-compartment bag comprising:
a first section having seven holders connected together about each of their outer peripheries and arranged in a circular pattern to form a unitary first section, each holder having a housing adapted to store one or more art-related instruments therein;
a second section selectively coupled to the first section, the second section having seven elongate caps connected together to seal a respective holder housing, each elongate cap including:
a first subsection, the first subsection having dimensions mating with the opening of a corresponding holder;
a second subsection coaxial with the first subsection;
an inner wall dividing the cap into two coaxial and opposite facing recesses, the recesses defining the first subsection and the second subsection, respectively;
at least one educational card stored inside the second subsection, wherein the at least one card comprises distinct indicia having visual representation of a topic of study;
wherein the inner wall comprises indicia on a side of the inner wall facing the first subsection, the indicia distinctly detailing the topic of study covered by the at least one card stored in the second subsection and corresponding to its respective distinct indicia; and
an endcap selectively covering the second subsection and securing the at least one card therein;
a handle disposed on one of the holders so as to enable easy carry of the multi-compartment bag; and
a latch mechanism disposed on the first section and the second section, the latch mechanism selectively securing the second section to the first section when the second section caps the first section;
distributing the art-related material to students during a teaching session;
removing the endcap and displaying the at least one card to the students during the teaching session, the at least one card having indicia relating to a study topic;
teaching the students on the study topic depicted on the at least one card; and
storing the art-related materials and at least one card in the holders and second subsections, respectively at the end of the instruction.

* * * * *